United States Patent [19]

Segal

[11] 4,207,373

[45] Jun. 10, 1980

[54] HIGHLY FILLED POLYOLEFIN COMPOSITIONS

[75] Inventor: Leon Segal, Randolph, N.J.

[73] Assignee: Allied Chemical Corporation, Morris Township, Morris County, N.J.

[21] Appl. No.: 527,100

[22] Filed: Nov. 25, 1974

Related U.S. Application Data

[63] Continuation-in-part of Ser. No. 354,268, Apr. 25, 1973, abandoned.

[51] Int. Cl.² ............................................. B32B 17/10
[52] U.S. Cl. .................................... 428/251; 156/158; 260/42.15; 260/42.17; 260/42.18; 260/42.46; 428/252; 428/284; 428/285; 428/286; 428/287; 428/288
[58] Field of Search ............... 260/42.17, 42.18, 42.46, 260/42.15; 161/158; 428/285, 286, 288, 287, 284, 251, 252; 156/62.2

[56] References Cited

U.S. PATENT DOCUMENTS

| | | | |
|---|---|---|---|
| 3,437,550 | 8/1969 | Paul | 161/93 |
| 3,684,645 | 8/1972 | Temple et al. | 264/257 |

FOREIGN PATENT DOCUMENTS

| | | | |
|---|---|---|---|
| 736551 | 6/1966 | Canada | 260/42.18 |
| 6504599 | 10/1966 | Netherlands . | |

OTHER PUBLICATIONS

Oleesky et al., Handbook of Reinforced Plastics, Reinhold Pub. Corp., New York, 1964, p. 142.

*Primary Examiner*—James H. Derrington
*Attorney, Agent, or Firm*—Roger H. Criss

[57] ABSTRACT

A highly filled, mechanically strong and impact resistant composition is prepared by combining about 25–80% polyolefin with about 10–60% rigid inorganic particulate filler of aspect ratio less than 15, thoroughly blending using high shear equipment until the flexural modulus is at least 1.25 times that of the base polyolefin and subsequently incorporating therein, using low or non-shear techniques, about 10–45% fibrous reinforcement of length at least 1½ inches.

12 Claims, No Drawings

HIGHLY FILLED POLYOLEFIN COMPOSITIONS

This application is a continuation-in-part of my application Ser. No. 354,268, filed Apr. 25, 1973, now abandoned.

This invention relates to a method for producing highly filled polyolefin resin compositions. The invention also relates to polyolefin resin compositions comprising rigid, inorganic fillers and fibrous reinforcing elements. These filled, reinforced resin systems can be molded or shaped into articles which exhibit outstanding mechanical properties.

Polyolefin resins such as polyethylene, polypropylene, poly(4-methylpentene-1), polybutylene are crystalline thermoplastics which find wide use as molded articles, films, and fibers.

The addition of rigid, inorganic particulate fillers into the polyolefin to form a uniform finished product is a commercially accepted practice. This offers many advantages such as improved stiffness, dimensional stability and importantly, the fillers may be used to dilute the polymer, thus producing a more economical product. Addition of certain fillers, such as talc, clay, and the like, into polyolefin molding compositions are also known to increase tensile and flexural modulus. However, the shock or impact resistance of polyolefin is normally reduced by the incorporation of invariably all rigid particulate fillers and decreases rapidly as the concentration of filler is increased. As a specific reference, Gray et al. in U.S. Pat. No. 3,516,957 state (Col. 7, lines 30-35) "Excessive amounts [of particular agents] can also be present and merely serve as fillers for the thermoplastic composition . . . it will be recognized that the presence of such fillers will generally diminish some of the valuable properties of the thermoplastic compositions as shaped articles". Thus, only minor amounts of filler, usually less than 10 percent, can be used without adversely affecting the mechanical properties of the final product.

Alternatively, expensive and time consuming filler coating or encapsulation techniques such as those described in U.S. Pat. No. 3,471,439, can be utilized to overcome the detrimental effects of filler upon the polymer properties.

The addition of glass fibers as filler or reinforcing agent, with or without the addition of minor quantities of particulate filler, however, yields beneficial mechanial properties as well as improved impact resistance. In order to achieve the benefits attainable by incorporating fibrous glass filler, it is necessary to use amounts of glass in the range of about 16-90 percent, preferably 35-60 percent as disclosed in U.S. Pat. No. 3,684,645 to Temple et al. The final preferred products of that patent contain 5-10% short glass fibers, 30-50% long glass fibers 60-40 percent resin and less than 10 percent filler. Since current prices for polypropylene and glass fibers are respectively about 4 or 8 times the price of filler, compositions of this kind would be relatively expensive and use of such filled polyolefins would be economically prohibitive for many applications.

Thus, there is a need for an efficient and economical method of producing glass filled polyolefin compositions which still exhibit excellent mechanical properties.

SUMMARY OF THE INVENTION

I have now found a method of incorporating particulate filler into polyolefins so as to alleviate the undesirable properties of these highly filled thermoplastic compositions. I have furthermore found a method of increasing the desirable properties of glass fiber reinforced polyolefins while substantially reducing their cost.

It is, therefore, an object of this invention to provide an economical, impact resistant, strong, moldable polyolefin composition.

Another object of the invention is to provide a method for producing a filled glass fiber reinforced polyolefin molding composition wherein the filler may be present in amounts up to about 60 percent.

These and other objects will be apparent from the following description.

I have found that up to about 60 percent inorganic particulate filler may be used together with approximately 25-80 percent polyolefin and 10-45 percent fibrous reinforcement of length at least $1\frac{1}{8}$ inches when processed in accordance with the methods of the present invention to produce a mechanically strong, economical molding composition.

It is intrinsic to the practice of this invention that the polyolefin and filler be thoroughly blended in high shear apparatus prior to the introduction of the fibrous material. The fibrous reinforcement is then added using conventional low or non-shear techniques.

DESCRIPTION OF THE PREFERRED EMBODIMENTS

The present invention is directed to highly filled, mechanically strong, polymeric compositions which are prepared by (a) combining a mixture of about 25-80%, preferably about 40-70%, by weight polyolefin resin with about 10-60%, preferably about 25-40%, rigid inorganic particulate filler with an aspect ratio (defined as $1/d$) of $<15$, (b) thoroughly blending, using high shear equipment, the mixture of (a) until the flexural modulus is at least 1.25 times that of the base polyolefin, and (c) incorporating therein using low or non-shear techniques long or continuous fibers, preferably glass, which account for from about 10 to 45% by weight, preferably from about 15 to 40% by weight.

Polyolefins useful herein are those polymers, including copolymers and blends formed from the polymerization of alphaolefins. Suitable polymers include polyethylene, polypropylene (and its isotatic forms) poly-(4-methylpentene-1) polybutylene and the like. Also useful are copolymers containing at least 50% by weight, but preferably at least 75 percent by weight polymerized olefins. Examples of monomers copolymerizable with an olefin include isobutylene or butane-1, ethyl acrylate, vinyl acetate, maleic anhydride, fumaric acid and the like. Polyblends containing at least 50 percent by weight polymerized olefin are also useful; for example, polypropylene-polystyrene polyblends, polymethylmethacrylate and polyethylene-polypropylene blends.

The fillers useful for the present invention are rigid, inorganic, particulate fillers with an aspect ratio, defined as the ratio of length to diameter of $1/d$, of less than 15. Although a large number of fillers, such as a wide variety of minerals, metals, metal oxides, siliceous materials including glass fibers, metal salts and mixtures thereof, can be found under this category; preferred fillers include talc, clay, asbestos, and various forms of silica.

Asbestos is herein applied to a group of naturally fibrous minerals, the principal variety of which is chrysotile, a hydrous magnesium silicate having the theoretical formula $3MgO.2SiO_2.2H_2O$. Other commercial varieties are amosite, a complex iron-magnesium silicate, and crocidolite, a sodium-iron hydrous silicate. Other less common forms of asbestos are tremolite and anthophyllite.

Clay or kaolin is herein applied to a fine-grained matural material composed primarily of hydrous and anhydrous aluminum silicates. A preferred form of clay or kaolin for use in this invention is kaolinite, which is a two-layer hydrous silicate having the general formula $Al_4(Si_4O_{10})(OH)_8$. Kaolinite consists of sheets of tetrahedrally coordinated silicon joined by an oxygen shared with octahedrally coordinated aluminum.

Talc or stearate is a natural hydrous magnesium silicate, $Mg_3(Si_4O_{10})(OH)_2$, and is a commonly occurring mineral in this country.

Silica is a dioxide of silicon, which occurs in the crystallite form, amorphous and crypto-crystalline forms. Among the siliceous ($SiO_2$) fillers, colloidal silica, amorphous silica and quartz, including novaculite, chalcedony and cristobalite are preferred.

Preferably, the fillers should have an average particle size in the range of 0.5 to 30 microns although particles having smaller or larger size can be employed. Also, preferred physical properties are achieved if the filler material has a Young's modulus of $10^7$ psi or greater and at least a Young's modulus twice as great as that of the polyolefin. The fillers may optionally be treated with various coupling agents and/or adhesion promoters, as is known to those skilled in the art.

In order to improve the bonding of filler with the polymeric matrix, a cross-linking agent along with the organo-silane has been found to be particularly advantageous. Suitable cross-linking agents include free-radical generating organic peroxides such as silyl peroxide, benzoyl peroxide, methyl ethyl ketone (MEK) peroxide and the like. These agents may be present in a combined amount of 2.0–40.0 gm per 1000 gms filler.

It is necessary that the fibrous reinforcements, useful for the purpose of the present invention, be in the form of long fibers of approximate length 1½ inches or more. This is required since the actual stress concentration is applied at the fiber ends and thus the use of long fibers decreases the number of ends per unit weight of fiber reinforcement used and increases the efficiency of the reinforcement. While maximum strength is obtained with fibers of infinite length, e.g. continuous filament composites, for fibers of shorter length, there is a certain "ineffective length" at each end of the fiber over which the fiber is stressed at less than the maximum fiber stress. A fiber longer than twice such "ineffective length" is a physical necessity, since the fiber stress must decrease from the maximum at or near the center of a long fiber, to zero at each end. Thus, it can be reasoned that long fibers are more efficient load bearing agents than shorter fibers since any "ineffective length" would be a smaller percentage of the total reinforcement length. Experimentation has shown, in fact, that for a glass fiber-epoxy resin system, fibers less than ½ inch in length are actually pulled out of the resin matrix before developing their ultimate strength. For such systems, furthermore, it has been demonstrated that while continuous filament composites are the most effective in their load bearing characteristics, fibers of length 2 to 5 inches or longer have over 90 percent of the efficiency of such continuous fiber composites, fiber of ½ inch length possess approximately 60 percent of the continuous fiber composite strength, and fibers ¼ inch long give composites which possess less than 40 percent of the continuous fiber composite strength. Similar if not identical results may be expected for other composite systems.

The use of short fibers, i.e. of average length 0.010" to 0.250", is not satisfactory with the compositions of this invention. The presence of large amounts of inorganic filler of relatively small particle size negates any possible strengthening effects contributed by these short fibers. The impact and shock resistance, especially, is affected detrimentally, since the large number of stress concentration points (at each filler particle and at each fiber end) is great. Furthermore, such short fibrous reinforcement is usually processed by blending and homogenizing together with the filler particles, as in a melt extruder or injection molding machine; the intimate contact produced in such equipment between the particulate fillers and the short fiber results in abrasion, breakage, and weakening of the glass fibers themselves. Thus, the conventional means of producing ternary polyolefin compositions cannot be used to obtain the results demonstrated by this invention.

The fibrous reinforcement may be of any material possessing a modulus of $10 \times 10^6$ or greater. Such fibrous materials would include glass or ceramic fibers, alumina, boron, steel, carbon, asbestos, sapphire fibers or synthetic fibers such as the polyamide fibers.

The term "fibers" as used herein is intended to be employed in a broad sense to include cloth, as well as individual, continuous fibers, more particularly known as filaments, which have a length greater than about 2 inches, groups of twisted strands, more particularly known as yarn or thread; untwisted or slightly twisted groups of strands generally looped back on one another, more particularly known as roving; discontinuous lengths of fibers, more particularly known as staple fibers, which can be spun into threads, twisted strands, slivers, roving or yarn.

In addition, mechanically bound, discontinuous nonwoven roving, yarn or strands may be employed. The method of mechanical binding may be by "needling", i.e. stitching with glass, or by depositing the long glass fibers in such a manner as to form an entangled, stable mat.

The siliceous fillers and glass fibers can be coated with suitable adhesion promoters and/or coupling agents to enhance the physical properties of the composite. Preferred coupling agents are organo-silanes containing reactive functional groups. A formula for silanes having the above characteristics is as follows:

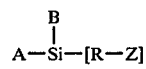

where A is a hydrolyzable functional group capable of reaction with a hydroxyl group, B is a monovalent hydrocarbon group, R is an alkylene group having from 1 to 20 carbon atoms, Z is a functional group capable of reaction with a free radical. Suitable silanes include:
Vinyl triethoxy silane
Triethoxysilylpropylamine
Gamma-glycidoxypropyltrimethoxysilane
Gamma-mercaptopropyltrimethoxy silane trichlorosilylbutyl acrylate The filled, glass fiber reinforced polyolefin compositions of the present invention are prepared by (a) combining polyolefins as herein defined and from 20 to 60% by weight inorganic filler or combination of fillers having an aspect ratio of <15, said filler having optionally bonded to its surface an organo-silane of the formula

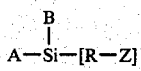

(b) mixing said polyolefin, filler, and organo-silane and optional cross-linking agent under conditions which can provide free radical in the mixture, until the flexural modulus is at least 1.25 times that of the base polyolefin and incorporating in the filled polyolefin from 10 to 45% by weight of fibrous glass reinforcements of 2" or longer, said fibrous reinforcements having optionally bonded to its surface an organo-silane.

The polyolefin and inorganic filler can be mixed in any high-shear processing equipment such as injection molders, Banbury mixers, two-roll mills with a differential shear between the two rollers, extruders, etc. The filler-polyolefin composite can be extruded into either pellets or film/sheet of desired thickness and width. It is essential to the practice of the present invention that the filler be well-blended with the polymer prior to introduction of the long glass filler to minimize abrasion and breakage of the delicate glass fibers by contact with the filler particles.

Thus obtained filled polyolefin is reinforced with long glass reinforcements in the form of continuous filaments, glass mat (chopped or continuous), glass cloth or any other suitable form. One method for combining the filled polyolefin and fibrous reinforcements is by any low or non-shear operations such as casting or compression molding the extruded pellets or films of composite and glass fibers under heat and pressure. The filled polymer and glass fibers can be arranged in alternating layers or in any other desired fashion to give a mechanically strong laminated composite. Alternatively, glass fiber reinforced polyolefin composite plates/sheets can be continuously produced by interposing the fibrous mat or cloth in between two extruded 'face' sheets of filled polyolefin and laminating the positioned layers by passing through a set of heated rolls, for example of the calendering type.

Surprisingly, the resultant highly filled products possess superior mechanical properties, and are characterized by impact resistances at least 10 times as great as that of the base polyolefin.

The particulate filled and long fiber reinforced polyolefin sheet can be utilized after fabrication in any one of several modes. For example, the sheet can be utilized as an end-product in itself or used as structural panelling, wall board, or as a base for a finished panel treated with paint, film overlays, wood-grain patterns, or sheet metal substitutes.

Alternatively, the thus obtained laminated composite sheet can be shaped into useful articles. This can be accomplished by heating the composite sheet (e.g. in an infrared oven) to above the melting point of the polymer. The heat-softened sheet is immediately charged into a matched mold of a hydraulic or a mechanical press. The press is allowed to close whereby under the section of pressure, the heat softened charge flows into the mold configuration. The stamping time is extremely fast, of the order of 10 to 20 seconds at the end of which the mold is opened to eject the molded part. Optionally the mold temperature can be kept at any temperature, but should be substantially below the melting point of the polymer so as to crystallize the polymer and to further enhance the surface finish of the article. The molding pressure varies from 200 to 3000 psi, or higher depending on the size and thickness of the part. The uniqueness of this fabrication process lies in the extremely fast cycle of the operation and thus is more analogous to metal stamping process than to the conventional plastics processing technique. This process is described in detail in U.S. Patent application Ser. No. 327,284, filed Jan. 29, 1973, now abandoned.

The invention is further illustrated by, but not limited thereto, the following examples. Parts expressed are by weight unless otherwise stated.

EXAMPLE 1 (Comparative)

Polypropylene having a melt index of 4.8 and density of 0.905 was extruded, using a 1" extruder at a melt temperature of 210° C. The extrudate, in the form of a 0.08" thick cylindrical strand, was quenched in a water bath kept at 23° C. and subsequently pelletized into a ⅛" size. The pellets were dried at 100° C. overnight in a vacuum oven. The dried pellets were compression molded into 12"×12"×0.100" sheets and test specimens were cut from the sheets. Mechanical testing was carried out at 23° C. in accordance with ASTM specifications. The results are shown in Table 1.

EXAMPLE 2 (Comparative)

Seven hundred grams polypropylene, of the kind characterized in Example 1, and 300 grams microcrystalline novaculite of average particle size 5 microns were dry blended in a Henschel mixer for 10–25 secs. to a flexural modulus approx. 1.25 times that of the polyolefin. The blend was then extruded on a ¾" pelletizing extruder at a rpm of 20–60 using a 3.5:1 compression ratio, single stage screw and further processed as in Example 1. The results are shown in Table 1.

EXAMPLE 3 (Comparative)

The procedure of Example 2 was repeated using a mixture of 50% polypropylene, 50% novaculite which was blended to a flexural modulus approximately 2.3 times that of the polyolefin. The results are shown in Table 1.

EXAMPLE 4 (Comparative)

Polypropylene pellets of the kind used in Example 1 were placed into a 210° C. platen of a compression molding press and layers of a reinforcing glass mat comprising 2" long chopped strands were incorporated. Three such layers of glass mat and four layers of pellets in an alternating arrangement were molded to obtain a composite laminated structure which was tested and reported as in Example 1.

EXAMPLE 5

The procedure of Example 4 was repeated using a filled system comprising 52.75% polypropylene and 47.25% novaculite having an average particle size 4 microns which were thoroughly blended in a Henschel mixer, as in Example 2, to a flexural modulus approximately 2 times that of the polyolefin. After incorporation of the glass mats comprising 2" long chopped strands, the composite contained 37% polypropylene, 33% novaculite and 30% glass fibers. The results are also shown in Table 1 below.

TABLE I

|  | Example 1 Polypropylene | Example 2 PP/Novaculite 70/30 | Example 3 PP/Novaculite 50/50 | Example 4 PP/Glass 70/30 | Example 5 PP/Novaculite/Glass 37/33/30 |
|---|---|---|---|---|---|
| Tensile Strength PSI | 4,300 | 3,000 | 2,600 | 10,100 | 12,500 |
| Tensile Modulus PSI $\times 10^{-6}$ | .16 | .25 | .40 | .64 | 1.22 |
| Flexural Strength PSI | 5,500 | 6,640 | 7,790 | 11,100 | 13,900 |
| Flexural Modulus PSI $\times 10^{-6}$ | .205 | .318 | .484 | .36 | .69 |
| Impact Strength ft-lb/in: Notched Izod | 0.4 | 0.4 | 0.2 | 6.3 | 7.6 |

It can be seen from Table I that the addition of up to 30% by weight of filler results in retention or improvement of the mechanical properties of the polypropylene, however, at concentrations of 50% filler, the tensile and impact strengths are drastically reduced while the other properties are moderately improved. The addition of 30% glass to the polypropylene results in improvement in all respects over the unfilled polypropylene, however, this 70% polypropylene/30% glass fiber mixture is relatively expensive. In accord with the results in Example 2, the substitution of 33% filler for 33% of the polypropylene could be expected to give a product with properties similar or slightly poorer than that of the polypropylene/glass mixture. Surprisingly, the results of Example 5 show the composition prepared in accordance with the process of this invention possesses superior and totally unanticipated properties, not only over the polypropylene composition alone but moreover, results superior to those of the polypropylene/glass composition. Thus we have obtained a composition with superior strength at a more economical price, as heretofore unknown in the prior art.

EXAMPLE 6 (Comparative)

A blend of 37% polypropylene, 33% novaculite, and 30% glass fibers of length ⅛" was blended in a drum tumbler, and extruded into pellets. After extrusion, microscopic examination revealed that the glass fibers were of average length of 0.015" to 0.025", with very few fibers being greater than 0.080" in length. The extruded pellets were compression molded into plaques from which test specimens were cut. Results are presented in Table II.

TABLE II

| PP/novaculite/short glass (37/33/30) | |
|---|---|
| Tensile Strength (psi) | 7,500 |
| Tensile Modulus (psi $\times 10^{-6}$) | 0.69 |
| Flexural Strength (psi) | 8,600 |
| Flexural Modulus (psi $\times 10^{-6}$) | 0.48 |
| Impact Strength Notched Izod ft-lb/in notch | 0.3 |

It should be noted that this composition is identical to that of Example 5, except that the fibers are "short fibers" as are commonly found in extruded or injection molded parts. It is readily seen that all properties are inferior to those presented in Table I (Example 5). The impact strength, especially, is extremely poor presumably because of the extreme shock sensitivity caused by the multitude of stress concentrating components. In fact the properties are below those presented in Example 4, since the replacement of the polypropylene by filler is seen to be ineffective if the fibrous reinforcement is short fiber reinforcement (i.e., $<\frac{1}{4}''$) rather than long fiber reinforcement (i.e., $>1''$). The results presented in Table II are those which might have been heretofore expected in the art, while the results of Table I (Example 5) represent the improvement over the prior art which is the object of this invention.

EXAMPLE 7

The procedure of Example 5 was repeated, except that 0.8% by weight of the filler of benzoyl peroxide (cross-linking agent) was added to the novaculite filler prior to blending of the ingredients. The composite was prepared and described in Example 5, and mechanical properties measured as follows:

| | |
|---|---|
| Tensile Strength (PSI) | 13,500 |
| Tensile Modulus (PSI $\times 10^{-6}$) | 1.37 |
| Flexural Strength (PSI) | 15,000 |
| Flexural Modulus (PSI $\times 10^{-6}$) | 0.92 |
| Impact Strength Notched Izod | 7.8 |

Note that most properties have improved over those of Example 5. It can be assumed that the cross-linking agent has increased the effectiveness of the interaction between the novaculite filler and the polymer.

EXAMPLE 8

The procedure of Example 5 was repeated, except that a 50-50 polyethylene-polypropylene poly-blend was utilized, and the filler was pre-blended with 0.2% benzoyl peroxide. The results are essentially those presented in Table I (Example 5), except that this composition is not now suitable for use at temperatures above 130° C.

EXAMPLES 9-13

The procedure of Example 5 was repeated using the following mixtures:

| MIxture | Proportions |
|---|---|
| polypropylene-polystyrene blend/silica/glass | 25/40/35 |
| PP/asbestos/glass | 35/35/30 |

-continued

| MIxture | Proportions |
|---|---|
| polyethylene/talc/glass | 30/40/30 |
| poly-(4-methyl pentene-1)/clay/glass | 40/40/20 |
| polyethylene/novaculite treated with t-glycidoxypropyltrimethoxy silane/glass | 35/50/15 |

These compositions gave results similar to those of the product of Example 5, thus showing that the concentration of polymer in a composite can be reduced by as much as one-half and it is still possible to obtain a composite having mechanical properties highly superior to those of the composite containing a higher amount of polymer. The composites produced according to this invention are thus economically more attractive since they are lower cost, higher performance engineering methods than were previously known.

EXAMPLE 14

Shaping of the composite laminated structure of Example 5 was accomplished in a deep-drawing press which had a triple-action die-set to produce 5 inch diameter cylindrical cups. The temperature of the polished steel die-set was adjusted by means of electric cartridge heaters.

Prior to introduction into the shaping apparatus, the composite sheet was pre-heated to 450° F. for 60 seconds in an infra-red oven; the die temperature was kept at 150° F. The pre-heated sheet was transferred to the stamping press and stamped at a pressure of 1000 psi maintained for 20 seconds.

EXAMPLE 15-24

Polypropylene pellets having the characteristics of Example 1 were dry blended in a tumbler with kaolin particles of an average particle size of ½ to 1 micron. The blend was extruded through a 1 inch extruder at a melt temperature of 210° C. and the extrudate, in the form of 0.10 inch thick cylindrical strands, was quenched in a water bath at 23° C. and pelletized to a ⅛ inch size. The pellets were molded into test specimens in a compression mold maintained at 400° to 450° F.

In some examples, several layers of reinforcing glass mat in the form of a continuous strand swirl mat having a nominal density of 1 ounce per square foot was pressed between two layers of the above-described pellets and were compression molded into test samples. The results of such tests are shown in Table III.

increased by approximately 20 to 40% over the mixture containing no filler. By comparing Example 19 with Examples 21 and 22, it can be seen that at a loading of 30% by weight of filler alone the maximum flexural modulus achieved is $0.37 \times 10^6$. However, when about 10% filler is incorporated with 20% glass fiber (a total inorganic content of 30%), the modulus increased to approximately $0.49 \times 10^6$, an increase of over 30% at the same total inorganic content. In addition, the heat absorption temperature of the samples which included glass fiber is significantly improved over those examples in which no glass fiber was employed.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A method for producing a highly filled impact resistant polymeric laminate comprising:
   (a) combining about 25-80% by weight based on the weight of the total system of a polyolefin with about 10-60% by weight rigid inorganic particulate filler of aspect ratio less than 15,
   (b) thoroughly blending, using high shear equipment, the mixture of (a) until the flexural modulus is at least 1.25 times that of the base polyolefin, and
   (c) laminating with the filled polyolefin of (a), about 10-45% by weight fiber reinforcement of length at least 1½ inches.

2. The method of claim 1 wherein the polyolefin and filler are blended in an extruder prior to incorporation of the fibers.

3. The method of claim 1 wherein the composition comprises, by weight, about 40 to 70% polyolefin, about 25-40% filler and about 15-40% fibrous reinforcement.

4. The method of claim 1 wherein the polyolefin and filler are mixed with an organo-silane coupling agent and a cross-linking agent under conditions which can provide a free radical to the mixture.

5. An impact resistant polymeric laminate, capable of being formed into molded parts, comprising about 25-80% by weight polyolefin, about 10-60% rigid inorganic particulate filler of aspect ratio less than 15 and about 10-45% fiber reinforcement of length at least 1½

TABLE III

| Example | Composition, % by weight | | | Flexural Strength psi | Flexural Modulus psi × 10⁻⁶ | Modulus Ratio* | Izod Impact Strength ft - lbs/in | | Heat Deflection Temp. at 264 psi, °C. |
|---|---|---|---|---|---|---|---|---|---|
| | Polypropylene | Kaolin | Glass Fiber | | | | Notched | Unnotched | |
| 15 | 100 | 0 | 0 | 6000 | 0.196 | 1.0 | 0.3 | 8.8 | 58 |
| 16 | 90 | 10 | 0 | 6300 | 0.26 | 1.33 | 0.4 | 5.9 | 60 |
| 17 | 85 | 15 | 0 | 6700 | 0.30 | 1.53 | 0.4 | 3.0 | 61 |
| 18 | 80 | 20 | 0 | 6700 | 0.30 | 1.53 | 0.4 | 5.9 | 60 |
| 19 | 70 | 30 | 0 | 6800 | 0.37 | 1.89 | 0.4 | 3.3 | 69 |
| 20 | 80 | 0 | 20 | 10,300 | 0.442 | — | 4.2 | 5.1 | 143 |
| 21 | 72 | 8 | 20 | 9400 | 0.48 | — | 5.9 | 6.4 | 143 |
| 22 | 68 | 12 | 20 | 9500 | 0.49 | — | 5.7 | 6.4 | 149 |
| 23 | 64 | 16 | 20 | 9500 | 0.52 | — | 5.1 | — | 145 |
| 24 | 56 | 24 | 20 | 11,000 | 0.61 | — | 5.2 | — | 151 |

*Ratio of flexural modulus in comparison with Example 15.

As can be seen from Example 16, at least 10% by weight of kaolin is required in order to obtain a modulus ratio of at least 1.25. Examples 21-24 demonstrate that the notched and unnotched Izod impact strengths are inches, in which the filler and polymer as compounded in the melt have a flexural modulus at least 1.25 times that of the base polyolefin prior to introduction of the fiber reinforcement.

6. The laminate of claim 5 comprising about 40–70% polyolefin, about 25–40% filler and about 15–40% fibrous reinforcement.

7. The laminate of claim 6 wherein the polyolefin is polypropylene.

8. The laminate of claim 7 wherein the rigid inorganic filler is selected from the groups of filler consisting of asbestos, talc, clay, and silica.

9. The laminate of claim 8 wherein the filler is microcrystalline novaculite.

10. The laminate of claim 9 wherein the fibrous reinforcement consists of glass fibers.

11. The method of claim 1 including the additional steps of softening said laminate by heat, immediately thereafter charging said heat-softened laminate into a matched mold, pressing said laminate into a molded part and removing the molded part from said mold.

12. A molded part formed from the laminate of claim 8.

* * * * *